United States Patent

Aoki et al.

[11] Patent Number: 5,954,880
[45] Date of Patent: Sep. 21, 1999

[54] ROLLER SUPPORT DEVICE IN MOLTEN METAL PLATING BATH

[75] Inventors: Akio Aoki; Yukio Sato; Shin Niizeki, all of Kanagawa; Takao Hashimoto, Osaka; Katsuhiro Nojima, Osaka; Toshihiro Mori, Osaka; Koji Ando, Ibaraki; Atsuhisa Yakawa, Osaka, all of Japan

[73] Assignees: NSK Ltd., Tokyo, Japan; Sumitomo Metal Industries, Ltd., Osaka, Japan

[21] Appl. No.: 08/808,220

[22] Filed: Feb. 28, 1997

Related U.S. Application Data

[63] Continuation of application No. 08/337,004, Nov. 7, 1994, abandoned.

[30] Foreign Application Priority Data

Nov. 5, 1993 [JP] Japan ................. 5-59507 U

[51] Int. Cl.$^6$ ............................... B05C 3/00
[52] U.S. Cl. ............................. 118/423; 118/419
[58] Field of Search ........................ 384/492, 565, 384/912, 913, 907.1, 477, 583; 118/423, 419

[56] References Cited

U.S. PATENT DOCUMENTS

| | | | |
|---|---|---|---|
| 4,974,768 | 12/1990 | Ebata | 228/54 |
| 5,002,907 | 3/1991 | Hayakawa et al. | 501/97 |
| 5,072,689 | 12/1991 | Nakagawa et al. | 118/419 |
| 5,252,130 | 10/1993 | Ookouchi et al. | 118/419 |
| 5,538,558 | 7/1996 | Ookouchi et al. | 118/419 |

FOREIGN PATENT DOCUMENTS

| | | |
|---|---|---|
| 61-90852 | 6/1986 | Japan . |
| 5187445 | 7/1993 | Japan . |

*Primary Examiner*—Brenda A. Lamb
*Attorney, Agent, or Firm*—Sughrue, Mion, Zinn, Macpeak & Seas, PLLC

[57] ABSTRACT

In a roller support device, an inner peripheral surface of a bearing box is covered with a material having a poor wettability with respect to a molten metal, such as tantalum, graphite, C/C composite, silicon carbide or the like. The molten metal does not adhere to the covered portion, or even if the molten metal adheres to and is solidified on the covered portion, the molten metal can be peeled off with a light force. Therefore, after a support roller is pulled up from the molten metal, the molten metal does not prevent a rolling bearing from shifting in the axial direction thereof so that the roller support device can prevent an excessive force from being applied to the rolling bearing when the support roller, after it is thermally expanded once, is contracted as the temperature falls.

14 Claims, 5 Drawing Sheets

ROLLER SUPPORT DEVICE IN MOLTEN METAL PLATING BATH

This is a continuation of application Ser. No. 08/337,004 filed Nov. 7, 1994 now abandoned.

BACKGROUND OF THE INVENTION

The present invention relates to a roller support device in a molten metal plating bath which is assembled into a plating apparatus, which performs successive plating treatments of different metals such as molten zinc and the like on the surface of a metal plate such as a long steel plate or the like, to rotatably support a roller for guiding the metal plate.

Figure 4:
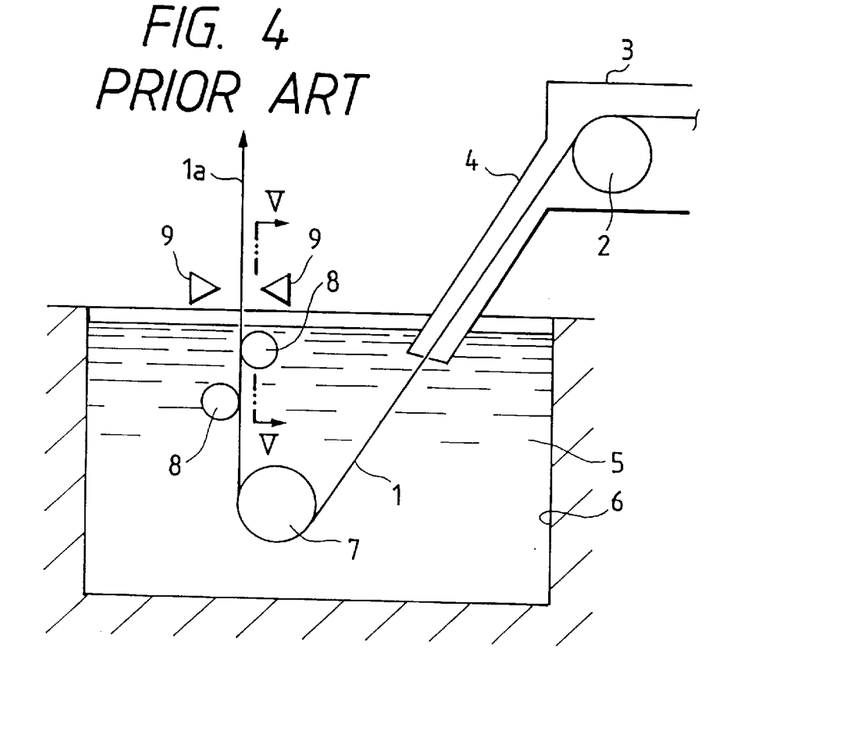
FIG. 4 is a substantially longitudinal section view of a molten zinc plating apparatus.
Figure 5:
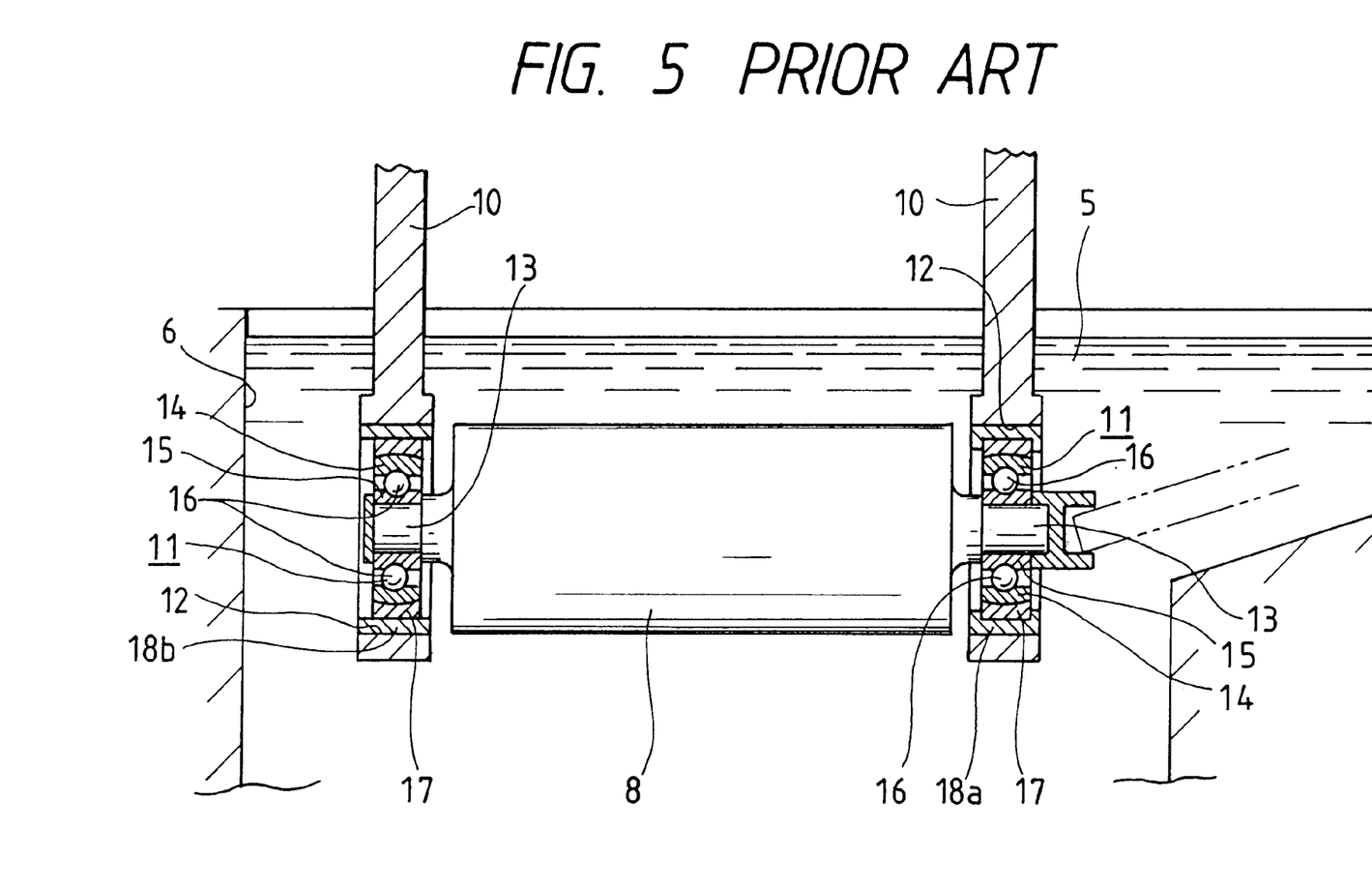
FIG. 5 is an enlarged section view taken along the arrow V—V shown in FIG. 4.

When a metal is plated on the surface thereof with a layer of a second metal, a plating method using an electrochemical treatment is used, a plating method using a so-called molten plating bath in which a metal serving as a core member is immersed in a plating bath in which the second metal is molten, is used. When a metal of a different kind such as zinc or the like is plated on the surface of a metal plate such as a long steel plate or the like by use of the above-mentioned molten plating bath, for example, as shown in Unexamined Japanese Utility Model Publication No. Sho. 61-90852 or Unexamined Japanese Patent Publication No. Hei. 5-187445, an apparatus as shown in FIGS. 4 and 5 is used.

A long metal plate 1 such as a steel plate or the like serving as a core member, which is fed out from an uncoiler (not shown), is guided by a suitable delivery roller 2 to pass through a continuous furnace 3 and a snout 4 and is further introduced into a plating vessel 6 in which a molten metal is stored. Then, the metal plate 1 is turned upwardly by a sink roller 7 and is fed through the plating vessel 6, whereby the molten metal 5 to serve as a plated layer is adhered to the surface of the metal plate 1. Then, a warp in the metal plate 1 is corrected by support rollers 8, 8 and thus the metal plate 1 is stabilized as a continuous plate, with the result that the metal plate 1 is taken out of the plating vessel 6 as a plated metal plate 1a. In FIG. 4, reference characters 9, 9 respectively designate nozzles which are used to regulate the amount of adhesion of the molten metal. After the plated metal plate 1a is passed through the nozzles 9, 9, the metal adhered to the surface of the plated metal plate 1a is cooled and solidified there, before the plated metal plate 1a is wound around a recoiler (not shown).

As described above, the sink roller 7 and support rollers 8, 8, respectively guide the metal plate 1 or rectifies the warp in the metal plate 1 while the metal plate 1 is immerse in the molten metal 5 at high temperatures. The respective ends of the sink roller 7 and support rollers 8, 8, for example, as shown in FIG. 5, are rotatably supported on the end portions of a pair of-support arms 10, 10 through rolling bearings 11, 11. That is, circular holes 12, 12 are respectively formed in the end portions of the support arms 10, 10. And, the above-mentioned rolling bearings 11, 11 are respectively interposed between the inner peripheral surfaces of the circular holes 12, 12 and the outer peripheral surfaces of shafts 13, 13 respectively projected out from the two end faces of the support roller 8, so that the support roller 8 is free to rotate. A support device for the sink roller 7 is structured in a similar manner.

Figure 1:
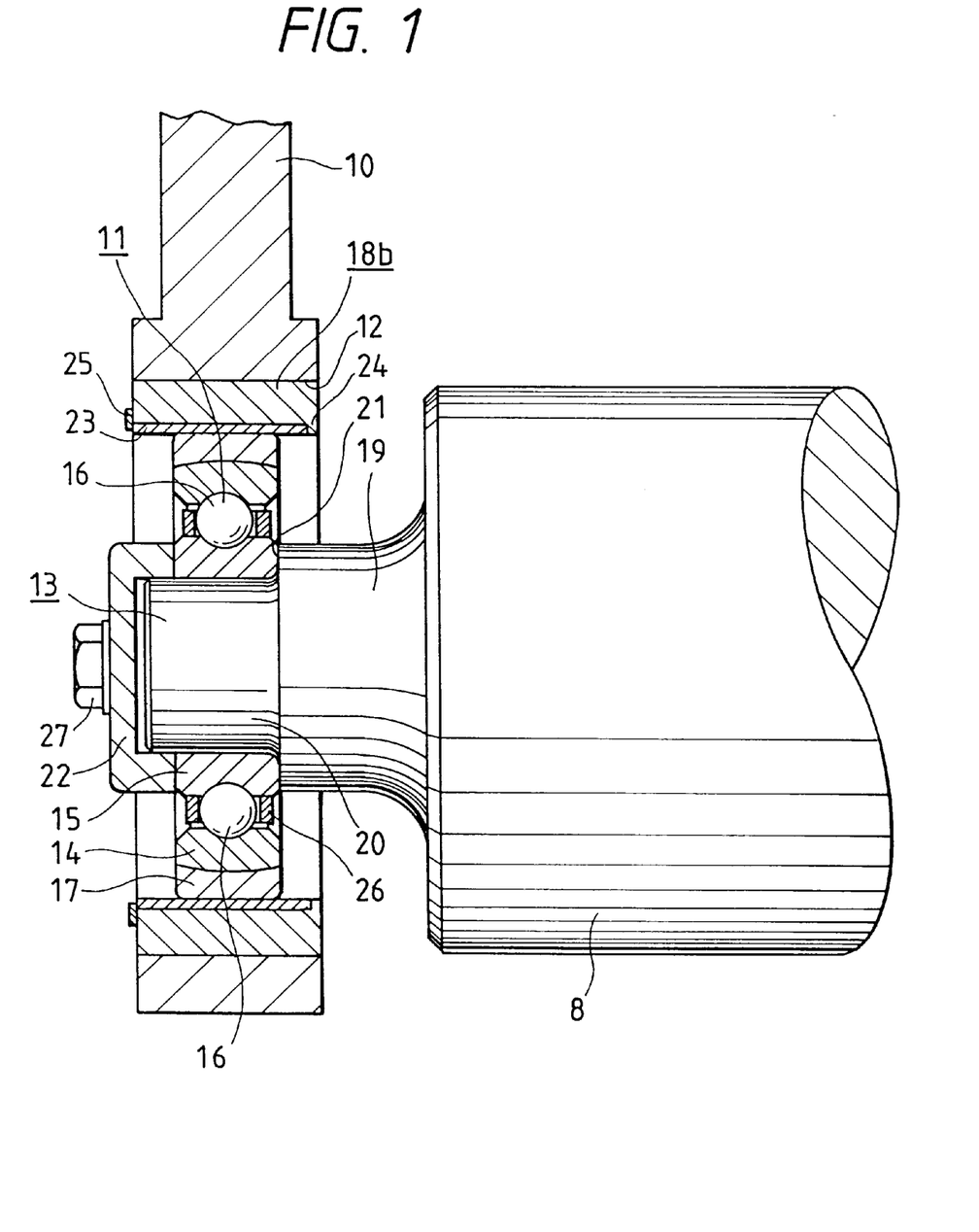
FIG. 1 is a longitudinal section view of the main portions of a first embodiment of a roller support device in a molten metal plating bath according to the present invention.
Figure 2:
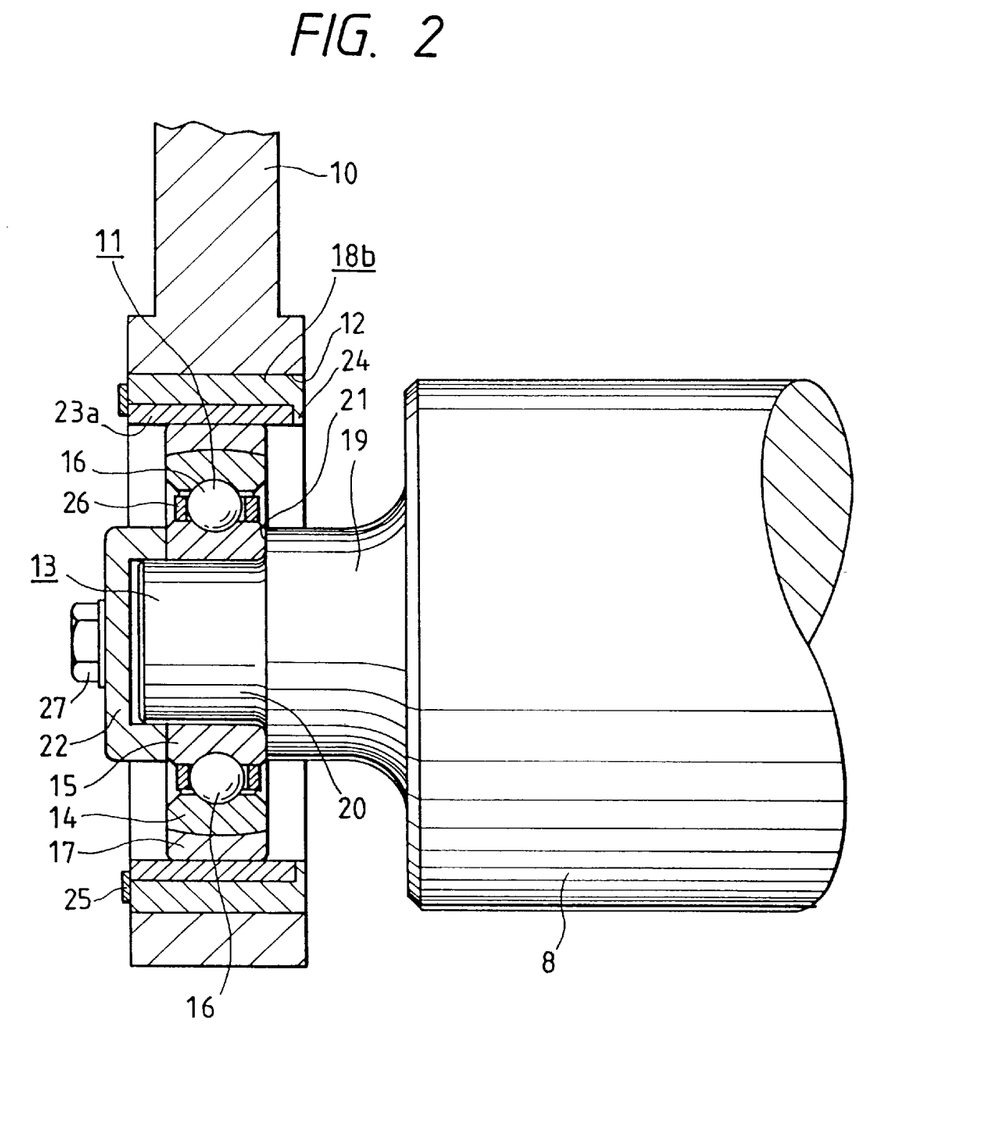
FIG. 2 is a longitudinal section view of the main portions of a second embodiment of a roller support device in a molten metal plating bath according to the present invention.

Since the rolling bearings 11, 11 are required to have high thermal resistance, they may be formed of ceramics or the like. That is, the rolling bearings 11, 11 are respectively composed of outer races 14, inner races 15, and a plurality of rolling elements 16, 16, all of which are formed of ceramics such as silicon nitride ($Si_3N_4$) or the like. Also, the plurality of rolling elements 16, 16 are rollingly supported by a cage 26 (e.g., as shown in FIGS. 1 and 2) in such a manner that mutually adjoining rolling elements 16, 16 are spaced a predetermined distance from each other.

In the above-mentioned manner, for example, the outer races 14, 14 that form a pair of rolling bearings 11, 11 for supporting the two end portions of the support roller 8 are respectively combined with alignment rings 17, 17 to form an outer race unit. That is, the respective outer races 14, 14 are pivotally fitted into the alignment rings 17, 17 to thereby form an automatic self-aligning bearing which is free to make up for misalignment between the axes of the outer races 14, 14 and the axes of the alignment rings 17, 17. And, the pair of alignment rings 17, 17 are supported in the insides of the circular holes 12, 12 through bearing boxes 18a, 18b, respectively. Further, one alignment ring (the right one in FIG. 5) of the pair of alignment rings 17, 17 is supported in the inside of the bearing box 18a for supporting the alignment ring 17 in such a manner that it cannot be shifted in the axial direction (in FIG. 5, in the right and left direction). On the other hand, the other alignment ring 17 (the left one in FIG. 5) is supported in the inside of the bearing box 18b for supporting the alignment ring 17 in such a manner that it can be freely shifted in the axial direction (in FIG. 5, in the right and left direction).

As described above, the reason why the other alignment ring 17 is supported in the inside of the circular hole 12 through the bearing box 18b in such a manner that it is free to shift in the axial direction is to absorb the thermal expansion and contraction of the support roller 8 due to changes in the temperature thereof. That is, while the plating apparatus is in use, the temperature of the support roller 8 rises up to a temperature of the order of 450° C. which is equal to the temperature of the molten metal 5 within the plating vessel 6 and, on the other hand, when the support roller 8 is taken up from the plating vessel 6 for maintenance, inspection or other purposes, the temperature of the support roller 8 falls to a room temperature. In this manner, the whole length of the support roller 8 varies to a considerable extent in accordance with the thermal expansion and contraction thereof between the time while the plating apparatus is in use and the time for maintenance or inspection thereof. This requires means for absorbing the variation in the whole length of the support roller 8. For this reason, as described above, one alignment ring 17 is supported in the inside of the bearing box 18b in such a manner that it is free to shift in the axial direction, so that the variation in the whole length of the support roller can be absorbed freely.

If the support roller 8 immersed in the molten metal 5 is taken up from the plating vessel 6 for maintenance, inspection or other operations thereof, then the other alignment ring 17 shifts to the right in FIG. 5 as the length of the support roller 8 is contracted in accordance with drops in the temperature of the support roller 8, thereby being able to absorb the amount of the contraction.

However, in the above-mentioned conventional roller support device in a molten metal plating bath, there are still remaining problems, which will be described below. That is, if the support roller 8 immersed in the molten metal 5 is taken up and is exposed to the air for maintenance, inspection or other purposes, then it is inevitable that part of the molten metal adheres to the inner peripheral surface of the bearing box 18b. And, the molten metal adhered to the inner peripheral surface of the bearing box 18b will be cooled and solidified before the temperature of the support roller 8 falls down sufficiently and thus the whole length of the support roller 8 is contracted completely.

When the thus cooled and solidified metal remains adhered to the inner peripheral surface of the bearing box 18b, then the adhered zinc prevents the alignment ring 17 from shifting in the axial direction within the bearing box 18b. As a result of this, as the support roller 8 is contracted, excessive forces are applied to the pair of rolling bearings 11, 11 in the thrust direction thereof, so that the rolling bearings 11, 11 can be broken.

That is, when the roller support device is used in the molten metal for a long period of time, as described above, rollers such as the support roller 8 and the like and the bearing portions of the end portions of the rollers are taken out from the molten metal bath into the air. And, such immersion of the rollers into the molten metal bath and taking-out of the rollers form the molten metal bath are carried out repeatedly and the support roller 8 is expanded and contracted each time it is immersed into and taken out from the molten metal bath. For this reason, one rolling bearing 11 of the pair of rolling bearings 11, 11 for supporting the two ends of the support roller 8 is fixed (that is, it is set immovable in the axial direction) and, at the same time, the other rolling bearing 11 is supported in such a manner that it can shift in the axial direction.

However, if the molten metal adheres to the sliding portion of the other rolling bearing 11 and is further solidified, then the adhered and solidified molten metal prevents the other rolling bearing 11 from shifting in the axial direction and, with the expansion and contraction of the support roller 8, a great thrust force is applied to both rolling bearings 11. And, if the thrust force becomes excessive, then the pair of rolling bearings 11, 11 supporting the two ends of the support roller 8, alignment ring 17, bearing boxes 18a, 18b, or the support arms 10, 10 respectively supporting the rolling bearings can be broken.

SUMMARY OF THE INVENTION

The present invention aims at eliminating the drawbacks found in a conventional roller support device. Accordingly, it is an object of the invention to provide an improved roller support device in a molten metal bath.

In attaining the above object, according to the present invention, there is provided a roller support device in a molten metal plating bath, which, includes a roller disposed in the molten metal plating bath, a shaft projecting from a central portion of an end face of the roller and extending concentrically with the roller, a support arm including an end portion thereof immersed in the molten metal plating bath, a bearing box disposed at the end portion of the support arm, and a rolling bearing interposed between an inner peripheral surface of the bearing box and an outer peripheral surface of the shaft, the rolling bearing including an outer race unit supported by the bearing box shiftably in an axial direction thereof.

In the roller support device in a molten metal plating bath according to the present invention, the inner peripheral surface of the bearing box is fitted with an outer peripheral of the outer race unit held in an inside of the bearing box, by means of a material having a poor wettability with respect to the molten metal If an alignment ring is used, then the outer peripheral surface of the outer race unit is the outer peripheral surface of the alignment ring. Also, as the rolling bearing is an automatic self-aligning roller bearing, for example, when no alignment ring is used, the outer peripheral surface of the outer race itself is the outer race unit.

Both of the above-mentioned inner and outer peripheral surfaces fitted with each other may be preferably covered with a material having a poor wettability with respect to the molten metal. When only one of them is covered with a material having a poor wettability, it is preferable that only the wider peripheral surface may be covered with such material.

Also, the above-mentioned poorly wettable material is selected according to the kind of the molten metals used in processing. For example, when the molten metal is zinc, aluminum, zinc alloy, or aluminum alloy, preferably, one of the following materials (1) to (6) may be used:

(1) Pure tantalum (Ta) or an alloy consisting mainly of tantalum (2) Graphite (3) C/C composite (carbon+carbon fiber)

(4) Silicon carbide (SiC)

(5) Pure molybdenum (Mo) or molybdenum disulfide ($MoS_2$)

(6) Zirconium oxide ($ZrO_2$)

A numerical value which represents the degree of the wettability objectively, is a contact angle θ (wetting angle) to be formed between a liquid drop (the molten metal) and a solid surface (the abovementioned one peripheral surface): that is, the larger the contact angle θ, the poorer the wettability. In this description, as the poorly wettable material, there is used a material which allows the molten metal to have a contact angle θ of 90° or more (θ≧90°), preferably, 100° C. or more (θ≧100°). If a material is used which allows the molten metal to have a contact angle less than 90°, then the molten metal is easily adhered to the surface of the material. For this reason, if there is used a material which allows the above contact angle of 90° or more, preferably, 100° or more, then the adhesion of the molten metal to the surface of the material can be prevented more effectively.

Further, if it is necessary to obtain an adhesion preventive effect which is stable for a long period of time, then it is preferable to use a material having a wettability reduction rate K of 40% or less, which is expressed by the following equation.

$$K = \{\theta_0 - \theta_{120}\} \times 100$$

where $\theta_0$ expresses an initial value of a contact angle (a contact angle just after a liquid drop comes into contact with a solid surface), and $\theta_{120}$ expresses a contact angle after the passage of 120 sec., respectively. If the wettability reduction rate K to be expressed in the above equation is restricted to 40% or less, then it is possible to prevent the rolling bearing from being broken even if it is used repeatedly for a long time. On the other hand, if the reduction rate K exceeds 40%, then the molten metal gradually adheres due to its repetitive use for a long time, which makes it unsuitable for preventing the rolling bearing from being broken effectively. The above-mentioned materials (1) to (6) satisfy all of the these conditions.

In the roller support device in a molten metal plating bath according to the present invention structured in the above-mentioned manner, the molten metal does not adhere to the fitted portion between the inner peripheral surface of at least one of the bearing boxes and the outer peripheral surface of the outer race unit which are fitted with each other and, even if the molten metal adheres and is then cooled and solidified, the adhered molten metal can be peeled off with a light force. For this reason, the metal, which is adhered to the fitted portion and then solidified, does not provide a great resistance to the axially shifting movement of the rolling bearing to thereby prevent a large force from being applied to a pair of rolling bearings forming the roller support device in the thrust direction thereof. This prevents the rolling bearings from being broken.

DETAILED DESCRIPTION OF THE PREFERRED EMBODIMENTS

FIG. 1 shows a first embodiment of a roller support device according to the present invention. In FIG. 1, a shaft 13, which is projected from the central portion of the end face of a support roller 8, includes a large diameter portion 19 located closer to the base end portion thereof, a small diameter portion 20 located closer to the end thereof, and a stepped portion 21 which connects the large and small diameter portions 19 and 20 with each other. An inner race 15, which forms a part of a rolling bearing 11, is fitted with the outside of the small diameter portion 20. Also, a cap 22 is fitted with the outside of the end portion of the small diameter portion 20 and is fixed by use of a bolt 27. And, the inner race 15 is held and fixed by and between the end edge of the cap 22 and the stepped portion 21.

On the other hand, an annular-shaped bearing box 18b made of SUS 304 (JIS G 4310) is fitted with and fixed to the inside of a circular hole 13 formed in the end portion (lower end portion) of a support arm 10. And, a sleeve 23, which is formed of a plate member of tantalum into a cylindrical shape, is fitted with the inner peripheral surface of the bearing box 18b to thereby cover the inner peripheral surface with tantalum. In the illustrated embodiment, one end edge (in FIG. 1, the right end edge) of the sleeve 23 is abutted against a flange portion 24 provided in an opening formed in one end of the bearing box 18b, while the other end edge is secured by a hold ring 25 which is threadedly fixed to another opening formed in the other end of the bearing box 18b. Further, in addition to SUS 304, the bearing box 18b can be made of the other steel such as pure iron or the like which is suitable for use in a molten metal plating bath.

If the length of the support roller 8 varies as it expands or contracts according to a change in the temperature thereof when the support roller 8 is inserted into and taken out from a plating vessel (see FIGS. 4 and 5) in which a molten metal 5 is stored, then an alignment ring 17, which is fitted with the outside of an outer race 14 forming the rolling bearing 11, is slid in the axial direction (in FIG. 1, in the right and left direction) within the sleeve 23 so as to absorb the variation in the length of the support roller 8. The alignment ring 17, similarly to the sleeve 23, may be preferably formed of a material which has a poor wettability with respect to the molten metal such as tantalum, graphite, C/C composite or the like. Further, as far as the poor wettability with respect to the molten metal, the alignment ring 17 can be formed of a steel such as a bearing steel, e.g., SUJ 2 (JIS G 4805), a steel alloy or the like of which the wettability is not poor in comparison with tantalum, graphite and C/C composite.

Especially, in the roller support device in a molten metal plating bath according to the present invention, the molten metal does not easily adhere to the inner peripheral surface of the sleeve 23 formed of tantalum and, even if the molten metal adheres to and is cooled and solidified on the inner peripheral surface, it can be peeled off simply by applying a weak force. That is, the solidified metal does not adhere to the inner peripheral surface of the sleeve 23 in such a manner that the metal prevents the alignment ring 17 from shifting in the axial direction. In particular, the zinc that has adhered to the inner peripheral surface of the bearing box 18b does not provide a great resistance to the rolling bearing 11, which is provided inside the alignment ring, shifting in the axial direction.

As a result of this, even when the support roller 8 is pulled up from the molten metal 5 (see FIG. 4) and is cooled outside the plating vessel 6, the shifting movement of the rolling bearing 11 can be achieved smoothly within the bearing box 18b to thereby prevent a large force from being applied to a pair of rolling bearings 11, 11 (see FIG. 5) forming the roller support device in the thrust direction thereof.

Next, in FIG. 2, there is shown a second embodiment of a roller support device according to the present invention. In this embodiment, a sleeve 23a which is used to cover the inner peripheral surface of the bearing box 18b, is formed of graphite or C/C composite. The sleeve 23a, which is formed of graphite or C/C composite more fragile than tantalum, has a large thickness when compared with the sleeve 23 formed of tantalum. The remaining portions of the structure and operation of the second embodiment are similar to the above-mentioned first embodiment and, therefore, the equivalent parts thereof are given the same designations and the description thereof is omitted here. In the illustrated embodiment, the bearing box 18b is formed separately from the support arm 10 and the separately formed bearing box 18b is fixed from behind to the support arm 10. However, the bearing box 18b can also be formed integrally with the support arm 10, if necessary.

Figure 2A:
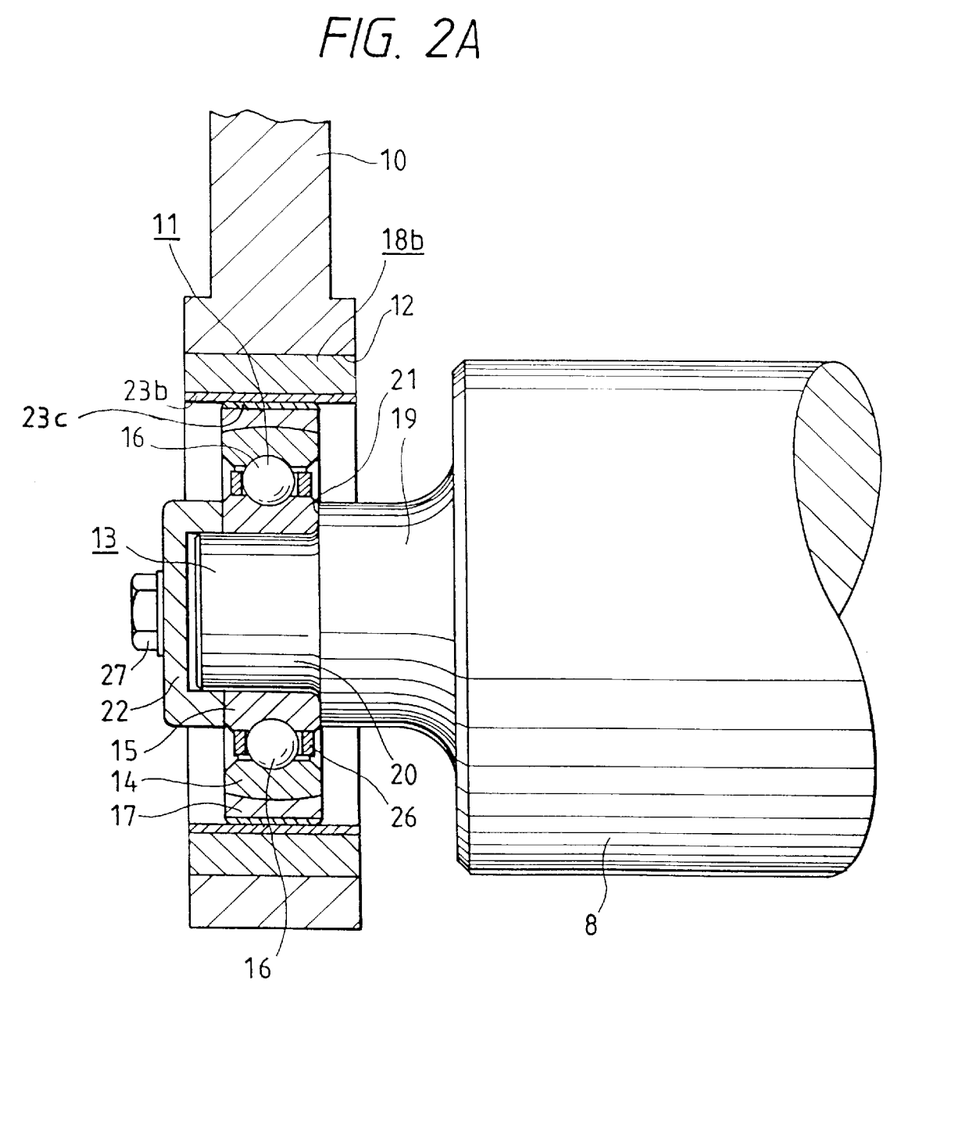
FIG. 2A is a longitudinal section view of the main portions of a third embodiment of a roller support device in a molten metal plating bath according to the present invention.

Also, shown in FIG. 2A, is a third embodiment wherein instead of the sleeve 23 (FIG. 1) formed of tantalum or the sleeve 23a (FIG. 2) formed of graphite or C/C composite for covering the inner peripheral surface of the bearing box 18b, a coating layer of silicon carbide 23b can also be formed on the inner peripheral surface of the bearing box 18. Since silicon carbide has little wettability with respect to the molten metal, even if the sleeve 23 or 23a is omitted, the shifting of the rolling bearing 11 caused by contraction after thermal expansion can be achieved as smoothly as or more smoothly than when the sleeve 23 or 23a is provided. Such silicon carbide coating layer can be formed easily by means of spray treatment. It is preferable that the coating layer 23b may be formed not only on the inner peripheral surface of the bearing box 18b but also on the outer peripheral surface of the alignment ring 17 (as indicated at 23c) in order to achieve the above shifting more smoothly. The remaining portions of the structure and operation of the third embodiment are similar to the above-mentioned first embodiment and, therefore, the equivalent parts thereof are given the same designations and the description thereof is omitted here.

Also, if the above-mentioned silicon carbide coating layer is formed on at least one of the inner peripheral surface of the alignment ring 17 and the outer peripheral surface of the outer race 14, then the shifting of the alignment ring 17 and outer race 14 can be achieved more smoothly so that the alignment of the outer race 14 can be improved. This technique can also be combined with the first and second embodiments of the present invention respectively shown in FIGS. 1 and 2. Further, as the material for the sleeves 23 and 23a and coatings 23b and 23c, besides the above-mentioned material including tantalum, graphite, C/C composite and silicon carbide, there can also be used alloy consisting mainly of tantalum, molybdenum or molybdenum disulfide, or zirconium oxide.

Figure 3:
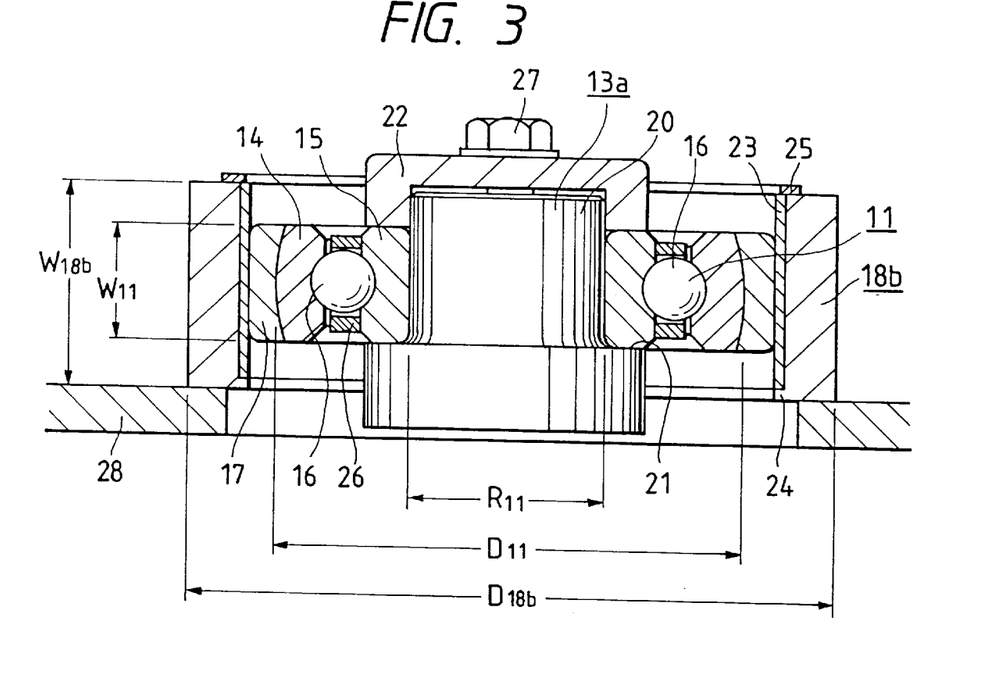
FIG. 3 is a section view of an experimental device used to measure a thrust load applied to a rolling bearing in order to confirm the effects of the present invention.

Next, description will be given below of the experiment that was conducted for confirmation of the effects of the present invention. In the experiment, as shown in FIG. 3, an assembly, which was constructed with a dummy shaft 13a, a cap 22, a bearing box 18b, an alignment ring 17 formed of C/C composite and a rolling bearing 11 formed of silicon nitride, were immersed into a molten metal. The assembly was then taken out from the molten metal in such a manner that an axial direction of the assembly corresponded to a horizontal direction. As shown in FIG. 3, a base 28 had a hole formed which the hole was slightly larger than an inner diameter of a sleeve 23. After the molten metal adhered to the assembly was cooled and solidified, the assembly was mounted on the base 18 so that an inner peripheral surface of the sleeve 23 located inside the hole. As described above, with the end face of the bearing box 18b held on an upper surface of the base 28, a thrust load facing downward in FIG. 3 was applied to a shaft 13a fixed to the inside of an inner race 15 of the rolling bearing 11 and to a cap 22 (and the thrust load was gradually increased) to confirm whether the alignment ring 17 and rolling bearing 11 could be pulled out from the inside of the bearing box 18b or not. The experiment was repeated three times. That is, the test piece that allows the alignment ring 17 to be pulled out from the bearing box 18b was assembled by being inserted the alignment ring 17 into the bearing box 18b again, was taken out after it was immersed again in the molten metal for a predetermined period of time, and was used again for the experiment. However, when the test piece was broken in any part thereof, the following experiments were canceled. Conditions that were common throughout the respective experiments were as follows:

Inside diameter $R_{11}$ of rolling bearing 11: 80 mm
Outside diameter $D_{11}$ of rolling bearing 11: 191 mm
Width $W_{11}$ of rolling bearing 11: 45 mm
Outside diameter $D_{18b}$ of bearing box 18b: 265 mm
Width $W_{18b}$ of bearing box: 80 mm The experiment was conducted a large number of times by changing the material of the sleeve 23 to be attached to the inner peripheral surface of the bearing box 18b or the material of the coating layer to be formed in the inner peripheral surface of the bearing box 18b, and the type and temperature of the molten metal. The results obtained from the experiments are shown in Tables 1 to 11 which will be described later. Referring to marks used in the test result columns in the respective tables, o expresses that the alignment ring 17 could be pulled out from the bearing box 18b without bearing any part of each test piece. Also, x expresses that some part of each test piece was broken in the pull-out operation of the alignment ring 17, and the broken part is stated in parentheses adjoining x. And, the melting temperature used in the respective tables is the temperature of the molten metal in which the test pieces are immersed.

Further, in the respective tables, the meanings of marks which represent the kind of the plating bath are as follows. However, unavoidable foreign that has no effect on the experimental results is not indicated in the tables.

A: Zn alloy containing Al of 15% by weight

B: Zn alloy containing Al of 1% by weight and Mg of 0.09% by weight

C: Zn-Al alloy containing Al of 55% by weight and Si of 1.5% by weight, with the remaining portions thereof consisting of Zn D: Al alloy containing Si of 9% by weight In the molten metal plating bath, the composition of the molten metal always varies delicately due to melting of a core member or the like. However, even if the composition of the above-mentioned materials A to D varies to some extent, such variation has few influences on the wettability between the surface of the sleeve 23 and molten metal, which is a characteristic of the present invention. For example, Al contained in an A bath is selected in the range from 0.01 to 0.3% by weight. Mg contained in a B bath is selected in the range no more than 0.2% by weight. Si contained in a C bath is selected in the range from 0.5 to 3% by weight. Si contained in a D bath is selected in the range from 5 to 15% by weight. Further, with regard to the temperature of each plating bath, the temperature of the A bath is selected in the range from 430 to 520° C. The temperature of the B bath is selected in the range from 430 to 520° C. The temperature of the C bath is selected in the range from 580 to 650° C. The temperature of the D bath is selected in the range from 680 to 730° C.

A first experiment was conducted using a sleeve formed of pure tantalum, as an example 1 belonging to the present invention. The results of the first experiment are shown in Table 1.

TABLE 1

| | | Immersion in molten metal | | Results of pull-out test | | |
|---|---|---|---|---|---|---|
| | Sleeve material | Kind of plating bath | Melting temperature (° C.) | First time | Second time | Third time |
| Example 1 | Ta | A | 450 | ○ | ○ | ○ |
| | | A | 510 | ○ | ○ | ○ |
| | | B | 440 | ○ | ○ | ○ |
| | | B | 520 | ○ | ○ | ○ |
| | | C | 590 | ○ | ○ | ○ |
| | | C | 640 | ○ | ○ | ○ |
| | | D | 690 | ○ | ○ | ○ |
| | | D | 730 | ○ | ○ | ○ |

A second experiment was conducted using a sleeve formed of tantalum alloy adding tungsten (W) 10% by weight, as an example 2 belonging to the present invention. The results of the second experiment are shown in Table 2.

TABLE 2

| | Sleeve material | Immersion in molten metal | | Results of pull-out test | | |
|---|---|---|---|---|---|---|
| | | Kind of plating bath | Melting temperature (° C.) | First time | Second time | Third time |
| Example 2 | Ta + 10% W | A | 450 | ○ | ○ | ○ |
| | | A | 510 | ○ | ○ | ○ |
| | | B | 440 | ○ | ○ | ○ |
| | | B | 520 | ○ | ○ | ○ |
| | | C | 590 | ○ | ○ | ○ |
| | | C | 640 | ○ | ○ | ○ |
| | | D | 690 | ○ | ○ | ○ |
| | | D | 730 | ○ | ○ | ○ |

A third experiment was conducted using a sleeve formed of graphite, as an example 3 belonging to the present invention. The results of the third experiment are shown in Table 3.

TABLE 3

| | Sleeve material | Immersion in molten metal | | Results of pull-out test | | |
|---|---|---|---|---|---|---|
| | | Kind of plating bath | Melting temperature (° C.) | First time | Second time | Third time |
| Example 3 | Graphite | A | 450 | ○ | ○ | ○ |
| | | A | 510 | ○ | ○ | ○ |
| | | B | 440 | ○ | ○ | ○ |
| | | B | 520 | ○ | ○ | ○ |
| | | C | 590 | ○ | ○ | ○ |
| | | C | 640 | ○ | ○ | ○ |
| | | D | 690 | ○ | ○ | ○ |
| | | D | 730 | ○ | ○ | ○ |

A fourth experiment was conducted using a sleeve formed of C/(C composite, as an example 4 belonging to the present invention. The results of the fourth experiment are shown in Table 4.

TABLE 4

| | Sleeve material | Immersion in molten metal | | Results of pull-out test | | |
|---|---|---|---|---|---|---|
| | | Kind of plating bath | Melting temperature (° C.) | First time | Second time | Third time |
| Example 4 | C/C composite (carbon + carbon fiber) | A | 450 | ○ | ○ | ○ |
| | | A | 510 | ○ | ○ | ○ |
| | | B | 440 | ○ | ○ | ○ |
| | | B | 520 | ○ | ○ | ○ |
| | | C | 590 | ○ | ○ | ○ |
| | | C | 640 | ○ | ○ | ○ |
| | | D | 690 | ○ | ○ | ○ |
| | | D | 730 | ○ | ○ | ○ |

A fifth experiment was conducted using a silicon carbide coating layer formed on the inner peripheral surface of the bearing box 18b, as an example 5 belonging to the present invention. The results of the fifth experiment are shown in Table 5.

TABLE 5

| | Sleeve material | Immersion in molten metal | | Results of pull-out test | | |
|---|---|---|---|---|---|---|
| | | Kind of plating bath | Melting temperature (° C.) | First time | Second time | Third time |
| Example 5 | SiC coating | A | 450 | ○ | ○ | ○ |
| | | A | 510 | ○ | ○ | ○ |
| | | B | 440 | ○ | ○ | ○ |
| | | B | 520 | ○ | ○ | ○ |
| | | C | 590 | ○ | ○ | ○ |
| | | C | 640 | ○ | ○ | ○ |
| | | D | 690 | ○ | ○ | ○ |
| | | D | 730 | ○ | ○ | ○ |

A sixth experiment was conducted using a sleeve formed of molybdenum, as an example 6 belonging to the present invention. The results of the sixth experiment are shown in Table 6.

TABLE 6

| | Sleeve material | Immersion in molten metal | | Results of pull-out test | | |
|---|---|---|---|---|---|---|
| | | Kind of plating bath | Melting temperature (° C.) | First time | Second time | Third time |
| Example 6 | Mo | A | 450 | ○ | ○ | ○ |
| | | A | 510 | ○ | ○ | ○ |
| | | B | 440 | ○ | ○ | ○ |
| | | B | 520 | ○ | ○ | ○ |
| | | C | 590 | ○ | ○ | ○ |
| | | C | 640 | ○ | ○ | ○ |
| | | D | 690 | ○ | ○ | ○ |
| | | D | 730 | ○ | ○ | ○ |

A seventh experiment was conducted using a sleeve formed of zirconium oxide, as an example 7 belonging to the present invention. The results of the seventh experiment are shown in Table 7.

TABLE 7

| | Sleeve material | Immersion in molten metal | | Results of pull-out test | | |
|---|---|---|---|---|---|---|
| | | Kind of plating bath | Melting temperature (° C.) | First time | Second time | Third time |
| Example 7 | ZrO$_2$ | A | 450 | ○ | ○ | ○ |
| | | A | 510 | ○ | ○ | ○ |
| | | B | 440 | ○ | ○ | ○ |
| | | B | 520 | ○ | ○ | ○ |
| | | C | 590 | ○ | ○ | ○ |
| | | C | 640 | ○ | ○ | ○ |
| | | D | 690 | ○ | ○ | ○ |
| | | D | 730 | ○ | ○ | ○ |

A eighth experiment was conducted using a sleeve formed of SUS 304 (JIS G 4310), as a comparative example 1 out of the present invention. The results of the fourth experiment are shown in Table 8.

TABLE 8

|  | Sleeve material | Immersion in molten metal | | Results of pull-out test First time |
|---|---|---|---|---|
|  |  | Kind of plating bath | Melting temperature (° C.) |  |
| Comparative example 1 | SUS304 | A | 450 | x (Alignment ring) |
|  |  | A | 510 | x (Alignment ring) |
|  |  | B | 440 | x (Alignment ring) |
|  |  | B | 520 | x (Alignment ring) |
|  |  | C | 590 | x (Alignment ring) |
|  |  | C | 640 | x (Alignment ring) |
|  |  | D | 690 | x (Alignment ring) |
|  |  | D | 730 | x (Alignment ring) |

A ninth experiment was conducted using a sleeve formed of SUS 316 (JIS G 4310), as a comparative example 2 out of the present invention. The results of the ninth experiment are shown in Table 9.

TABLE 9

|  | Sleeve material | Immersion in molten metal | | Results of pull-out test First time |
|---|---|---|---|---|
|  |  | Kind of plating bath | Melting temperature (° C.) |  |
| Comparative example 2 | SUS316 | A | 450 | x (Alignment ring) |
|  |  | A | 510 | x (Alignment ring) |
|  |  | B | 440 | x (Alignment ring) |
|  |  | B | 520 | x (Alignment ring) |
|  |  | C | 590 | x (Alignment ring) |
|  |  | C | 640 | x (Alignment ring) |
|  |  | D | 690 | x (Alignment ring) |
|  |  | D | 730 | x (Alignment ring) |

A tenth experiment was conducted using a sleeve formed of SUS 316L (JIS G 4310); as a comparative example 3 out of the present invention. The results of the ninth experiment are shown in Table 10.

TABLE 10

|  | Sleeve material | Immersion in molten metal | | Results of pull-out test First time |
|---|---|---|---|---|
|  |  | Kind of plating bath | Melting temperature (° C.) |  |
| Comparative example 3 | SUS316L | A | 450 | x (Alignment ring) |
|  |  | A | 510 | x (Alignment ring) |
|  |  | B | 440 | x (Alignment ring) |
|  |  | B | 520 | x (Alignment ring) |
|  |  | C | 590 | x (Alignment ring) |
|  |  | C | 640 | x (Alignment ring) |
|  |  | D | 690 | x (Alignment ring) |
|  |  | D | 730 | x (Alignment ring) |

An eleventh experiment was conducted using a sleeve formed of Inconel, as a comparative example 4 out of the present invention. The results of the eleventh experiment are shown in Table 11.

TABLE 11

|  | Sleeve material | Immersion in molten metal | | Results of pull-out test First time |
|---|---|---|---|---|
|  |  | Kind of plating bath | Melting temperature (° C.) |  |
| Comparative example 4 | Inconel | A | 450 | x (Alignment ring) |
|  |  | A | 510 | x (Alignment ring) |
|  |  | B | 440 | x (Alignment ring) |
|  |  | B | 520 | x (Alignment ring) |
|  |  | C | 590 | x (Alignment ring) |
|  |  | C | 640 | x (Alignment ring) |
|  |  | D | 690 | x (Alignment ring) |
|  |  | D | 730 | x (Alignment ring) |

As can be clearly understood when the contents of Tables 1 to 7 showing the results of the experiments belonging to the present invention are compared with the contents of Tables 8 to 11 showing the results of the experiments not belonging to the present invention, the roller support device in a molten metal plating bath according to the present invention allows pull out the rolling bearing 11 including the alignment ring 17 from the bearing box 18b without the interference by the adhered molten metal. Also, as can be seen clearly from Tables 1 and 2, the alloy formed of tantalum with tungsten of 0 to 10% by weight added thereto, similarly to the tantalum alloy formed of tantalum and tungsten of 10% by weight, is able to prevent the poor pull-out of the rolling bearing 11 due to the adhered molten metal.

When enforcing the roller support device in a molten metal plating bath according to the present invention, preferably, a cage 26 assembled into the rolling bearing 11 for holding a plurality of rolling elements 16, 16, similarly to the sleeves 23 and 23a, may be formed of a material which has a poor wettability with respect to the molten metal. In this case, it is preferable that the cage 26 may be formed of pure tantalum or alloy consisting mainly of tantalum. In this manner, if the cage is formed of pure tantalum or alloy consisting mainly of tantalum, even when the molten metal adheres to and is then solidified on the cage 26 in maintenance and inspection, the adhered metal can be removed easily and thus the maintenance and inspection operations can be performed easily. In other words, the amount of a washing solution such as hydrochloric acid HCl or the like to be used when the rolling bearing 11 is acid washed is reduced to thereby save labor and time required for waste fluid treatment. Since alloy formed of pure tantalum or alloy consisting mainly of tantalum has acid resistance, there is no possibility that the cage 26 can be damaged by the acid washing operation to be performed in maintenance and inspection.

Tables 12 to 15 as mentioned hereinafter show the experiment that was conducted for confirmation of the effects in the case where the cage 26 was formed of a material which had a poor wettability with respect to the molten metal. The experiment was conducted with the same assembly used for confirmation of the effects of the present invention as shown in FIG. 3. The sleeve 23 was formed of pure tantalum. The alignment ring 17 was formed of C/C composite. After the rolling bearing 11 was rotated in the state that the bearing box 18b, the alignment ring 17 and the rolling bearing 11 were immersed into the molten metal for 24 hours, the assembly were taken out from the molten metal. Then, after the assembly was cooled to a room temperature, the assembly was used for the same pull-out experiment as shown in Tables 1 to 11.

In this experiment, each cage 26 was formed of pure tantalum (example 8), tantalum alloy (example 9) adding tungsten (W) 10% by weight, SUS 304 (comparative example 5), or graphite (comparative example 6). Each of the rolling bearings 11 in which these four kinds of the cages 26 were constructed with the inner and outer races 15 and 14, and the rolling elements 16 was assembled as shown in FIG. 3. Thus, a plurality of the pull-out experiments were conducted while varying the type of the molten metal and the temperature of the plating bath as a group of the examples 8 and 9, and the comparative examples 5 and 6. The results of the experiments are shown in Tables 12 to 15. Referring to marks used in the test result columns in the respective tables, 0 expresses that the alignment ring 17 and the rolling bearing 11 could be pulled out from the inner peripheral surface of the sleeve 23 without bearing any part of each test piece. Also, x expresses that some part of the alignment ring 17 and the rolling bearing 11 was broken in the pull-out operation, and the broken part is stated in parentheses adjoining x. And, the melting temperature used in the respective tables is the temperature of the molten metal. Further, the meanings of marks which represent the type of the molten metal are similar to that of the experiment that was conducted for confirmation of the effects of the present invention.

TABLE 12

|  | Molten metal | Material of cage | Results of pull-out test | | |
|---|---|---|---|---|---|
|  |  |  | First time | Second time | Third time |
| Example 8 | A | Ta | ○ | ○ | ○ |
| Example 9 | 490° C. | Ta + 10 W | ○ | ○ | ○ |
| Comparative example 5 |  | SUS304 | ○ |  |  |
| Comparative example 6 |  | Graphite | ○ | x (cage) |  |

TABLE 13

|  | Molten metal | Material of cage | Results of pull-out test | | |
|---|---|---|---|---|---|
|  |  |  | First time | Second time | Third time |
| Example 8 | B | Ta | ○ | ○ | ○ |
| Example 9 | 490° C. | Ta + 10 W | ○ | ○ | ○ |
| Comparative example 5 |  | SUS304 | ○ |  |  |
| Comparative example 6 |  | Graphite | ○ | x (cage) |  |

TABLE 14

|  | Molten metal | Material of cage | Results of pull-out test | | |
|---|---|---|---|---|---|
|  |  |  | First time | Second time | Third time |
| Example 8 | C | Ta | ○ | ○ | ○ |
| Example 9 | 620° C. | Ta + 10 W | ○ | ○ | ○ |
| Comparative example 5 |  | SUS304 | ○ |  |  |
| Comparative example 6 |  | Graphite | x (cage) |  |  |

TABLE 15

|  | Molten metal | Material of cage | Results of pull-out test | | |
|---|---|---|---|---|---|
|  |  |  | First time | Second time | Third time |
| Example 8 | D | Ta | ○ | ○ | ○ |
| Example 9 | 720° C. | Ta + 10 W | ○ | ○ | ○ |
| Comparative example 5 |  | SUS304 |  |  |  |
| Comparative example 6 |  | Graphite | x (cage) |  |  |

With the comparative example 5 in Tables 12 to 14, the experiment could not continue because the cage 26 was melted due to corrosion when the cage 26 was immersed into the molten metal a second time. Therefore, the experiment was terminated after the second time. In the comparative example 5 in Table 15, since the cage 26 was melted due to corrosion at the first time of the immersing and the experiment was terminated after the first time. Further, according to the comparative example 6 in Tables 12 to 15, after the assemblies were taken out from the molten metal bath, the cage 26 was broken as the molten metal collected in a lower portion inside the bearing was contracted by cooling extremely. Therefore, the experiment was stopped before the pull-out test was conducted the first time (Tables 14 and 15) or the second time (Tables 12 and 13).

Also, when only one of the peripheral surfaces is covered with a material having a poor wettability in order to prevent the rolling bearing 11, alignment ring 17 or support arm 10 from being broken due to the expansion and contraction of the support roller 8, if only the wider peripheral surface can be covered, then the above object can be attained even when the narrower peripheral surface is not covered. On the other hand, when only the narrower peripheral surface is covered with the material having a poor wettability, the molten metal, which adheres to the portion of the wider peripheral surface projecting from the narrower peripheral surface, is solidified there, which can produce a possibility that the rolling bearing is prevented from shifting in the axial direction. For example, in the embodiments respectively shown in FIGS. 1 and 2, a sufficient effect can be obtained simply by covering only the inner peripheral surface of the wide bearing box 18b with the material having a poor wettability. On the other hand, when only the outer peripheral surface of the narrow alignment ring 17 is covered with a material having a poor wettability, there is a possibility that the shift of the alignment ring 17 with respect to the bearing box 18b can be impaired when the molten metal adhered to the portion of the inner peripheral surface of the bearing box 18b projecting from the alignment ring 17 is solidified.

Further, the roller support device in a molten metal plating bath according to the present invention is not limited to the support roller 8 as in the illustrated embodiments, but it can also be enforced in other roller support portions for supporting other rollers such as the sink roller 7 and the like, provided that the roller is used in a state where it is immersed in the molten metal 5.

When the roller support device in a molten metal plating bath according to the present invention is enforced, the outer race 14, inner race 15, and rolling elements 16, 16 forming the rolling bearing 11 may be preferably formed of silicon nitride which is sintered according to a hot isostatic process (HIP) and which contains magnesium oxide (MgO) of 0.1 to 2.0% by weight, cerium oxide ($CeO_2$) of 0.2 to 3.5% by weight and strontium oxide (SrO) of 0.1 to 2.0% by weight, a total of 1.5 to 5.0% by weight. If the above-mentioned outer race 14, inner race 15, and rolling elements 16, 16 forming the rolling bearing 11 are formed of silicon nitride with the above materials added thereto as binders, then the durability of the resultant rolling bearing 11 can be secured. Further, according to the rolling bearing 11 used in the experiment of which the results are shown in Tables 1 to 15 as described above, all materials of the outer race 14, inner race 15, and rolling elements 16, 16 forming the rolling bearing 11 use silicon nitride which is sintered by the hot isostatic process (HIP) and which adds as a binder a material containing MgO of 1.1% by weight, $CeO_2$ of 1.9% by weight and SrO of 0.6% by weight.

The reason why the durability of the rolling bearing 11 of ceramics must be secured in this manner is as follows: The rolling bearing that supports a roller in a molten metal plating bath rotates in a state where the molten metal is present in the periphery of the-bearing. Also, the rolling bearing 11 that is taken out from the molten metal into the air for maintenance and inspection is acid washed by means of a solution of 10% HCL (when the molten metal is zinc) in order to remove the molten metal adhered thereto. Such acid washing is performed repeatedly each time the rolling bearing is taken out from the molten metal. Therefore, in order to secure the durability of the rolling bearing 11, the material that forms the rolling bearing 11 not only must be corrosion resistant with respect to the molten metal but also must be corrosion resistant with respect to the acid that is used for acid washing. The rolling bearing formed of ceramics that satisfies the above condition is little corrosive under the above-mentioned environmental conditions and thus can provide a sufficient durability, Also, the reason why MgO, $CeCO_2$ and SrO are added to silicon carbide in order to secure the durability of the rolling bearing formed of ceramics and the reason why the amounts of addition of the materials are limited to the above-mentioned ranges are as follows. That is, MgO reacts with $SiO_2$ at a relatively low temperature of the order of 1600° C. and thus, while it is forming a liquid phase serving as a glassy boundary phase in the grain boundary of silicon carbide, the MgO facilitates the sintering of the silicon carbide. It is believed that an acid nitride system glass phase having a high corrosion resistance is formed during the above reaction of the MgO with $SiO_2$. The composition of such acid nitride system glass phase is insufficient when the amount of addition of MgO is less than 0.1% by weight and thus the obtained sintered material (silicon nitride) is insufficient in strength. On the other hand, if the amount of addition of MgO, which has a poor corrosion resistance when it is used independently, is greater than 2.0% by weight, then the durability of the obtained sintered material is insufficient. For this reason, the amount of addition of MgO is limited to the range of 0.1 to 2.0% by weight.

Also, the reason why $CeO_2$ is added is that $CeO_2$ has a high affinity for the above-mentioned acid nitride system glass phase and diffuses fast into the grain boundary to enhance uniformity with the acid nitride system glass phase not only to thereby enhance corrosion resistance but also to improve the strength of the sintered silicon nitride. If the amount of addition of $CeO_2$ is less than 0.2% by weight, it is insufficient as the amount to be diffused in the grain boundary, which results in the insufficient uniformity of the acid nitride system glass phase. On the other hand, if the amount of addition of $CeO_2$l which shows a poor corrosion resistance when it is used independently, is greater than 3.5% by weight, then the obtained sintered material is insufficient in durability. This is the reason why the amount of addition of $CeO_2$ is limited to the range of 0.2 to 3.5% by weight.

Then, it is believed that, for the same reason as the above-mentioned MgO, SrO forms an acid nitride system glass phase having an excellent corrosion resistance. And, if SrO is present together with MgO, then it further facilitates the sintering of the silicon nitride. This is the reason why SrO is added. The composition of the thus obtained acid nitride system glass phase is insufficient when the amount of addition of SrO is less than 0.1% by weight and thus the obtained sintered material (silicon nitride) is insufficient in strength. On the other hand, if the amount of addition of SrO, which offers a poor corrosion resistance when it is used independently, is greater than 2.0% by weight, then the durability of the obtained sintered material is insufficient. This is the reason why the amount of addition of SrO is limited to the range of 0.1 to 2.0% by weight.

Further, even when the respective amounts of addition of MgO, $CeO_2$ and SrO satisfy the above-mentioned conditions, if the total amount of addition of them is less than 1.5% by weight, then the formation of the above acid nitride system glass phase is insufficient and thus a sufficient strength cannot be obtained. On the other hand, when the total amount of addition of them is greater than 5.0% by weight, even if the respective amounts of addition of them satisfy the above conditions, an excessive glass phase is produced, which makes it impossible to obtained a sufficient corrosion resistance This is the reason why the total amount of addition of MgO, $CeO_2$ and SrO is limited to the range of 1.5 to 5.0% by weight.

Next, description will be given below of experiments conducted for confirmation of effects obtained when the outer race 14, inner race 15, and rolling elements 16, 16 respectively forming the rolling bearing 11 are formed of the above-mentioned materials. In the experiments, as shown with examples 10 to 17 and comparative examples 10 to 20 in Tables 16 and 17, silicon nitride with MgO, $CeO_2$ and SrO added thereto at their respective rates shown in Tables 16 and 17 was sintered according to a hot isostatic process (HIP) to thereby produce a test piece having a length of 40 mm, a width of 4 mm, and a thickness of 3 mm, and the bending strength of the test piece was measured. The bending strength test method was based on the 3-point bending strength which is set forth in JIS R 1601.

TABLE 16

| | | Composition (weight %) | | | | Initial value of bending strength | A bath (460° C.) | | B bath (460° C.) | | C bath (600° C.) | | D bath (700° C.) | |
|---|---|---|---|---|---|---|---|---|---|---|---|---|---|---|
| | | MgO | CeO$_2$ | SrO | Total amount | | Bending strength after 10 cycle processing | Bending strength reduction rate (%) | Bending strength after 10 cycle processing | Bending strength reduction rate (%) | Bending strength after 10 cycle processing | Bending strength reduction rate (%) | Bending strength after 10 cycle processing | Bending strength reduction rate (%) |
| Example | 10 | 0.1 | 1.0 | 1.0 | 2.1 | 970 | 960 | 99 | 950 | 97 | 940 | 97 | 930 | 96 |
| | 11 | 2.0 | 1.0 | 0.5 | 3.5 | 1020 | 1000 | 98 | 980 | 96 | 970 | 95 | 960 | 94 |
| | 12 | 1.0 | 0.2 | 1.0 | 2.2 | 980 | 970 | 99 | 960 | 98 | 950 | 97 | 940 | 96 |
| | 13 | 1.0 | 3.5 | 0.5 | 5.0 | 1080 | 1050 | 97 | 1040 | 96 | 1030 | 95 | 1020 | 94 |
| | 14 | 1.0 | 1.0 | 0.1 | 2.1 | 970 | 960 | 99 | 950 | 98 | 940 | 97 | 930 | 96 |
| | 15 | 1.0 | 1.0 | 2.0 | 4.0 | 1050 | 1040 | 99 | 1030 | 98 | 1020 | 97 | 1010 | 96 |
| | 16 | 1.0 | 2.0 | 1.0 | 4.0 | 1050 | 1050 | 100 | 1050 | 100 | 1050 | 100 | 1050 | 100 |
| | 17 | 0.5 | 0.5 | 0.5 | 1.5 | 940 | 940 | 100 | 940 | 100 | 940 | 100 | 940 | 100 |
| Comparative example | 10 | 0 | 2.0 | 1.0 | 3.0 | 750 | 740 | 99 | 720 | 96 | 710 | 95 | 700 | 93 |
| | 11 | 3.0 | 1.0 | 1.0 | 5.0 | 1030 | 820 | 80 | 760 | 74 | 690 | 67 | 660 | 64 |
| | 12 | 1.0 | 0 | 1.0 | 2.0 | 710 | 680 | 96 | 670 | 94 | 660 | 93 | 640 | 90 |
| | 13 | 0.5 | 4.0 | 0.5 | 5.0 | 1030 | 860 | 83 | 790 | 77 | 730 | 71 | 690 | 67 |
| | 14 | 1.0 | 2.0 | 0 | 3.0 | 750 | 740 | 99 | 710 | 95 | 680 | 91 | 670 | 89 |
| | 15 | 1.0 | 1.0 | 3.0 | 5.0 | 1030 | 700 | 68 | 690 | 67 | 660 | 64 | 650 | 63 |
| | 16 | 0.5 | 0.2 | 0.5 | 1.2 | 590 | 570 | 97 | 520 | 88 | 510 | 86 | 500 | 85 |
| | 17 | 1.5 | 3.0 | 1.5 | 6.0 | 1050 | 800 | 76 | 760 | 72 | 720 | 69 | 690 | 66 |

In the columns of the above-mentioned Table 16 in which the bending strengths are stated, the initial value (unit: MPa) of the bending strength expresses the value of the bending strength before the test piece is immersed into the molten metal, while the bending strength value (MPa) at 10 cycle process expresses the value obtained after the test piece was made to experience ten times the cycle of reproduction of the using state of the rolling bearing 11 in the molten metal. For example, in an A bath, the test piece is immersed in a molten metal at a temperature of 460° C. for 24 hours and, after then, the test piece is taken up into the air and is immersed (that is, acid washed) in 10% HCL at a room temperature for 8 hours, which operations are considered as 1 cycle. Also, the reduction rate of the bending strength expresses the ratio of the bending strength after the 10 cycle process with respect to the initial value of the bending strength. Further, the meanings of the reference characters A to D expressing the kinds of molten metals are the same as in the above-mentioned pull-out test. As the material for the outer race 14, inner race 15 and rolling elements 16, 16 forming the rolling bearing 11 used in the roller support device in a molten metal plating bath, it is preferable that the initial value of the bending strength thereof is 90 MPa or more and the reduction rate of the bending strength thereof is 90% or more. If the material satisfies these two conditions (that is, 90 MPa or more and 90% or more), then the rolling bearing formed of the material can be used for a long period of time.

While taking these conditions into consideration, if statements in Table 16 are checked, then it can be found that materials according to the examples 10 to 17 of the present invention are all able to produce the rolling bearing that can be used for a long period of time. On the other hand, it can be found that, since materials according to comparative examples 10, 12, 14 and 16 are respectively short of the amount of addition of either of MgO, CeO$_2$ or SrO (in the comparative example 16, the total amount of addition of MgO, CeO$_2$ and SrO is also short), any of the bending strength initial values thereof cannot reach 900 MPa and thus they are not suitable for use. Also, Table 16 shows that, in materials according to comparative examples 11, 13, 15 and 17, the amount of addition of either of MgO, CeO$_2$ or SrO is excessive (in the comparative example 17, the total amount of addition of MgO, CeO$_2$ and SrO is also excessive) and, therefore, the bending strength initial values thereof are sufficiently large but the reduction rates thereof are short so that the materials according to the comparative examples 11, 13, 15 and 17 are also not suitable for use.

On the other hand, in order to examine the influences of sintering methods on the strength of test pieces, test pieces were formed of silicon nitride with MgO, CeO$_2$ and SrO added thereto at such rates as shown in Table 17 according to an atmospheric sintering method and the bending strengths of the respective test pieces were measured similarly to the above-mentioned Table 16. However, in Table 17, the tests were conducted using only the A bath. Tests in the B, C and D baths were omitted because they were equal to or greater in temperature than the A bath and thus the respective reduction rates thereof are much greater than that of the A bath (they can be judged sufficiently from the tendency of the A bath).

TABLE 17

| | | Composition (weight %) | | | Total amount | Bending strength (MPa) | | Bending strength reduction | Sintering |
|---|---|---|---|---|---|---|---|---|---|
| | | MgO | CeO$_2$ | SrO | (weight %) | Before processing | After 10 cycle processing | rate (%) | process |
| Comparative example | 18 | 1.0 | 1.0 | 3.0 | 5.0 | 560 | 500 | 89 | Atmospheric sintering |

TABLE 17-continued

|    | Composition (weight %) | | | Total amount (weight %) | Bending strength (MPa) Before processing | Bending strength (MPa) After 10 cycle processing | Bending strength reduction rate (%) | Sintering process |
|----|------|------|-----|------|------|------|-----|------|
|    | MgO | CeO$_2$ | SrO | | | | | |
| 19 | 2.0 | 1.0 | 0.5 | 3.5 | 420 | 420 | 100 | Atmospheric sintering |
| 20 | 0.5 | 2.5 | 0.5 | 3.5 | 410 | 380 | 93 | Atmospheric sintering |

As can be seen clearly from Table 17, even when MgO, CeO$_2$ and SrO are added to the silicon nitride at the rates that satisfy the above-mentioned conditions, if the silicon nitride is sintered according to other sintering process than the hot isostatic process, then the initial value of the bending strength of the silicon nitride is too low.

Further, in Table 18, there are shown the results of an experiment which was conducted to check the influences of the kinds of additives to be added to the silicon nitride on the strength of the sintered material. The experiment, the results of which are shown in Table 18, was also conducted by use of only the A bath. In Table 18, there are shown comparative examples 21 to 25. In the comparative examples 21 to 24, Y$_2$O$_3$ and Al$_2$O$_3$ were added instead of CeO$_2$ and SrO and, in the comparative example 25, Y$_2$0$_3$ and ZrO$_2$ were added instead of CeO$_2$ and SrO. The statements of Table 18 tell that, in the examples in which other materials than MgO, CeO$_2$ and SrO were used, the initial values of the bending strength are high but the reduction rates of the bending strength are great so that such silicon nitrides are not suitable for use.

Since the roller support device in a molten metal plating bath according to the present invention is structured and operated in the above-mentioned manner, it prevents a large thrust load from being applied to the rolling bearing to thereby ensure that the rolling bearing can be prevented against breakage.

What is claimed is:

1. A roller support device in a molten metal plating bath, the device comprising:

a roller disposed in the molten metal plating bath;

a shaft projecting from a central portion of an end side of the roller and extending axially and concentrically with the roller;

a support arm including an end portion immersed in the molten metal plating bath for supporting the shaft;

a bearing box disposed at the end portion of the support arm and having an inner peripheral surface inside the bearing box; and at least one rolling bearing assembly interposed between the inner peripheral surface of the bearing box and an

TABLE 18

|   |   | Composition (weight %) | | | Total amount (weight %) | Bending strength (MPa) Before processing | Bending strength (MPa) After 10 cycle processing | Bending strength reduction rate (%) | Sintering process |
|---|----|-----|-------|-----|-----|------|-----|----|------|
|   |    | MgO | Y$_2$O$_3$ | Al$_2$O$_3$ | | | | | |
| Comparative example | 21 | — | 4.0 | 3.0 | 7.0 | 1020 | 660 | 65 | HIP |
| | 22 | — | 3.0 | 1.0 | 4.0 | 980 | 590 | 60 | Hot pressing |
| | 23 | 2.0 | 2.0 | — | 4.0 | 970 | 700 | 72 | HIP |
| | 24 | 2.5 | — | 1.0 | 3.5 | 1020 | 710 | 70 | HIP |
| | | | | ZrO$_2$ | | | | | |
| | 25 | 1.0 | 1.5 | 1.5 | 4.0 | 1010 | 620 | 61 | HIP |

The above-described examples are explained on the basis of such a structure that the inner peripheral surface of the bearing box 18b is fitted with the outer peripheral of the outer race unit through the material having a poor wettability with respect to the molten metal. However, if only the shaft 13 and a member supporting the shaft 13 are freely shifted to each other in the axial direction, the thermal expansion and contraction due to changes in the temperature can be absorbed. Accordingly, while the cap 22 is omitted, if the inner peripheral surface of the inner race 15 forming the rolling bearing 11 is fitted with the outer peripheral of the shaft 13 through the material having a poor wettability with respect to the molten metal, then the inner race 15 and the shaft 13 can be combined to each other so that they may be freely shifted to each other in the axial direction.

outer peripheral surface of the shaft, the rolling bearing assembly being supported by the bearing box shiftably in an axial direction thereof, wherein the rolling bearing assembly is held within the inside of the bearing box, the bearing box having a coating layer on the inner peripheral surface, the coating layer being comprised of a low wettability material with respect to a molten metal, such that there is a contact angle of at least 90° between a liquid drop of the molten metal and the coating layer, the coating layer being fitted with the rolling bearing assembly.

2. The roller support device of claim 1, wherein the rolling bearing assembly comprises a cage formed of the low wettability material which is selected from the group consisting of pure tantalum, tantalum alloy, graphite, carbon and carbon fiber composite, pure molybdenum, and molybdenum disulfide.

3. The roller support device of claim 1, wherein the rolling bearing assembly comprises an inner race, an outer race unit, a plurality of rolling elements, and a cage, wherein the outer race unit comprises an alignment ring which is slidable in the coating layer and an outer race fitted into the alignment ring.

4. The roller support device of claim 3, wherein the alignment ring is formed of the low wettability material for operating an axial self alignment in cooperation with the outer race.

5. The roller support device of claim 1, wherein the low wettability material is selected from the group consisting of pure tantalum, tantalum alloy, graphite, carbon and carbon fiber composite, pure molybdenum, and molybdenum disulfide.

6. The roller support device of claim 1, wherein the rolling bearing assembly comprises an inner race, an outer race unit, and a plurality of rolling elements, each of the outer race unit, the inner race, and the rolling elements is formed of a material which comprises silicon nitride sintered by a hot isostatic process, the material including MgO of 0.1 to 2.0% by weight, $CeO_2$ of 0.2 to 3.5% by weight and SrO of 0.1 to 2.0% by weight, and a total thereof being 1.5 to 5.0% by weight.

7. The roller support device of claim 6, wherein the rolling bearing assembly comprises a cage formed of the low wettability material which is selected from the group consisting of pure tantalum, tantalum alloy, graphite, carbon and carbon fiber composite, pure molybdenum, and molybdenum disulfide.

8. The roller support device of claim 1, wherein the rolling bearing assembly comprises an inner race, an outer race unit, and a plurality of rolling elements, wherein the outer race unit includes a second coating layer on the outer peripheral surface of the outer race unit, the second coating layer being fitted with the bearing box and being formed of the low wettability material.

9. A roller support device in a molten metal plating bath, comprising:

a roller disposed in the molten metal plating bath;

a shaft projecting from a central portion of an end side of the roller and extending axially and concentrically with the roller;

a support arm including an end portion immersed in the molten metal plating bath for supporting the shaft;

a bearing box disposed at the end portion of the support arm and having an inner peripheral surface inside the bearing box; and at least one rolling bearing assembly interposed between the inner peripheral surface of the bearing box and an outer peripheral surface of the shaft, the rolling bearing assembly being supported by the bearing box slidably in an axial direction thereof, wherein the bearing box is fitted with the rolling bearing assembly held within the inside of the bearing box through a low wettability material with respect to molten metal, such that there is a contact angle of at least 90° between a liquid drop of the molten metal and the low wettability material, wherein the bearing box includes a sleeve covering the inner peripheral surface of the bearing box, and the sleeve is fitted with the rolling bearing assembly and formed of the low wettability material.

10. The roller support device of claim 9, wherein the low wettability material is selected from the group consisting of pure tantalum, tantalum alloy, graphite, carbon and carbon fiber composite, silicon carbide, pure molybdenum disulfide and zirconium oxide.

11. The roller support device of claim 9, wherein the rolling bearing assembly comprises a cage formed of the low wettability material which is selected from the group consisting of pure tantalum, tantalum alloy, graphite, carbon and carbon fiber composite, pure molybdenum, and molybdenum disulfide.

12. The roller support device of claim 9, wherein the rolling bearing assembly comprises an inner race, an outer race unit, and a plurality of rolling elements, each of the outer race unit, the inner race, and the rolling elements is formed of a material which comprises silicon nitride sintered by a hot isostatic process, the material including MgO of 0.1 to 2.0% by weight, $CeO_2$ of 0.2 to 3.5% by weight and SrO of 0.1 to 2.0% by weight, and a total thereof being 1.5 to 5.0% by weight.

13. A roller support device in a molten metal plating bath, comprising:

a roller disposed in the molten metal plating bath;

a shaft projecting from a central portion of an end side of the roller and extending axially and concentrically with the roller;

a support arm including an end portion immersed in the molten metal plating bath for supporting the shaft;

a bearing box disposed at the end portion of the support arm and having an inner peripheral surface inside the bearing box; and at least one rolling bearing assembly interposed between the inner peripheral surface of the bearing box and an outer peripheral surface of the shaft, the rolling bearing assembly being supported by the bearing box shiftably in an axial direction thereof, wherein the bearing box is fitted with the rolling bearing assembly held within the inside of the bearing box through a low wettability material with respect to molten metal, such that there is a contact angle of at least 90° between a liquid drop of the molten metal and the low wettability material, wherein the bearing box includes a sleeve covering the inner peripheral surface of the bearing box, and the sleeve is fitted with the rolling bearing assembly and formed of the low wettability material; and wherein the rolling bearing assembly comprises an inner race, an outer race unit, a plurality of rolling elements, and a cage, wherein the outer race unit comprises an alignment ring which is slidable in the sleeve and an outer race fitted into the alignment ring.

14. The roller support device of claim 13, wherein the alignment ring is formed of the low wettability material for accomplishing an axial self alignment in cooperation with the outer race.

* * * * *